AUTOMATIC COLOR BALANCE FOR COLOR TELEVISION

Filed Nov. 3, 1966 3 Sheets-Sheet 1

INVENTOR.
Paul Kollsman
BY
Howard G. Russell
his ATTORNEY

AUTOMATIC COLOR BALANCE FOR COLOR TELEVISION

Filed Nov. 3, 1966 3 Sheets-Sheet

INVENTOR.
Paul Kollsman
BY
Howard G. Russell
his ATTORNEY

Nov. 18, 1969 P. KOLLSMAN 3,479,448

AUTOMATIC COLOR BALANCE FOR COLOR TELEVISION

Filed Nov. 3, 1966 3 Sheets-Sheet 3

INVENTOR.
Paul Kollsman
BY
Howard G. Russell
his ATTORNEY

United States Patent Office 3,479,448
Patented Nov. 18, 1969

3,479,448
AUTOMATIC COLOR BALANCE FOR COLOR TELEVISION

Paul Kollsman, 100 E. 50th St., New York, N.Y. 10022

Continuation-in-part of application Ser. No. 577,002, Sept. 2, 1966. This application Nov. 3, 1966, Ser. No. 591,812
Int. Cl. H04n *1/46, 9/02*
U.S. Cl. 178—5.2 34 Claims

ABSTRACT OF THE DISCLOSURE

The present improvement involves the maintenance of color balance by appropriate, preferably automatic, adjustment of at least two color beams, for example electron beams, in a receiver or of the relative intensity levels of the three color signals transmitted by a transmitter in such a manner that a comparison standard ratio is matched. This is accomplished by comparing a comparison signal to the standard. The comparison signal may be a multicolor test spot and is transmitted at intervals. The correction is made either in an individual receiver or at the transmitter monitored by a receiver.

The faithful reproduction of a scene televised in color depends in a large measure on the proper balance of the three primary colors, such as red, green and blue, on the screen of the television picture tube. If the balance is disturbed the sky may appear purple or green instead of blue, and the skin or flesh color of persons appears unreal.

While most television receivers are fitted with means for individually presetting the luminance of each of the three primary colors, no means or method are known, as far as I am aware, for automatically correcting color imbalance as it arises either at the receiver or at the transmitter.

This is a continuation-in-part of my copending application Ser. No. 577,002, filed Sept. 2, 1966 now abandoned.

The present invention is based on the generally known fact that the combination of the three primary colors in their proper balance of luminance produces true white.

The invention proceeds from the basic consideration that a multicolor light spot, which may be, but need not necessarily be, white and contains the three primary colors in a certain ratio of luminance of the three primary colors may be televised on the same channel, either substantially simultaneously or in alternating sequence, with the scene to be televised, then transmitted, and finally reproduced at a receiver. This spot is then subject to the same causes of imbalance as also affect the televised scene.

Color imbalance of the scene is therefore ascertainable by comparing, optically, electrically or otherwise, the received spot with a reference spot at the receiver. The reference spot may be of identical composition of its component primary colors as the light spot scanned by the transmitter camera, although, for reasons stated further below, the reference spot may also be tinted.

Stated in broader terms, a comparison reference is provided at the receiver for determining whether an imbalance was or is being caused in the ratio of the transmitted primary colors. If color imbalance is detected, an appropriate adjustment can then be made at the receiver, for example by varying the ratio of intensities of the three electron beams of the picture tube, in order to restore the proper balance or to produce a predetermined arbitrarily chosen imbalance (i.e., a tint) incorporated in the reference.

If, in order to meet exacting demands, the adjustment or color balance correction is carried out continuously, any imbalance is automatically correctable, regardless of whether it is occasioned during the image scanning, the signal generation, the signal coding, or the signal transmission at the receiver, whether it was occasioned by atmospheric conditions, or whether it arose during the signal reception, the signal decoding, or the reconversion of the video signals into visible light.

It is therefore possible to compare the received and reproduced light spot with a reference light spot, for example by means of optical color comparator assembly, in order to determine color balance aberration and to effect an appropriate correction.

More broadly stated, color imbalance at the receiver is basically caused by an imbalance in the relative levels of the intensities of the three electron beams which excite the phosphor dots on the television tube screen. While the color imbalance may be ascertained by actually reproducing a light spot from the transmitted signals, the light spot need not be actually reproduced optically, as the three beam currents of the picture tube which represent the primary colors can be compared at the instant the beams would reproduce a spot, if they were to fall on a screen. The ratio of the beam currents, as it exists at the receiver during the periods of scanning of the light spot by the transmitter camera, furnishes a measure of the color imbalance and can therefore be compared with a comparison standard provided at the receiver in a suitable form. This comparison standard may be purely electrical and is presettable by calibration of appropriate circuit elements at the receiver, for example by presetting color comparators for two of the three primary colors.

As previously pointed out, the comparison standard is arbitrary, and different television viewers may pre-select different standards. One viewer may prefer to use the same standard white used by the camera and transmission station. Another viewer may prefer a slight tint, so as to make faces appear more deeply tanned than they actually are. Whatever the chosen comparison standard, the reproduced color balance of the picture tube is automatically correctable to match that standard.

As will appear from the following detailed description, it is convenient and simple to employ a combination of electrical and optical means in order to detect color imbalance.

For this purpose a light spot may actually be reproduced on a portion of the picture tube screen which is "visible" only to an optical color comparator, but is otherwise masked, as to be invisible to the viewer.

The reproduced spot may also be moved onto and off the picture tube screen by appropriate manipulation of the horizontal control, so as to be visible for calibration and adjustment purposes and to be invisible during periods of normal viewing during which the sensing of color imbalance conditions may then be done purely electrically by comparing the respective color beam level intensities, as they exist during the moments of scanning of the spot at the transmitter by the three image tube beams in the camera.

As a further alternative, the color balance comparison may be carried out periodically, for example at the beginning of a television program at which, in a manner similar to the broadcasting of a timing pattern, a light spot is transmitted for a brief period of time sufficient for the correction, whereafter the program follows which, in turn, may be followed by a further adjust-by-the-light spot period.

The ratio of the picture tube beam currents is readily ascertainable during the periods the light spot is scanned by the camera and corresponding signals are transmitted and received. This ratio represents the prevailing color balance at the receiver and is compared with the arbitrarily selected and preset reference at the receiver.

The control signals produced during the moments of scanning of the spot—as distinguished from the video signals proper of the scanned scene, exclusive of the spot—can also be made to stand out by selecting a light spot intensity exceeding in brightness any and all portions of the scene to be televised. In such a case the picture beam currents reach maxima or peaks during the moments of scanning of the spot and may be detected and compared as such maxima, so as to be recognizable by a circuit which remains nonresponsive to the lower levels of the beam currents during the periods of scanning of the scene. Such a circuit is responsive to the color balance monitoring portion of the transmitted signals and remains unaffected by the scene signals.

The objects, features and advantages of this invention will appear more fully from the detailed description which follows accompanied by drawings showing, for the purpose of illustration, how the invention may be carried out. The invention also resides in certain new and original features of construction and combination of elements, as well as steps and combination of steps hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

Figure 1:
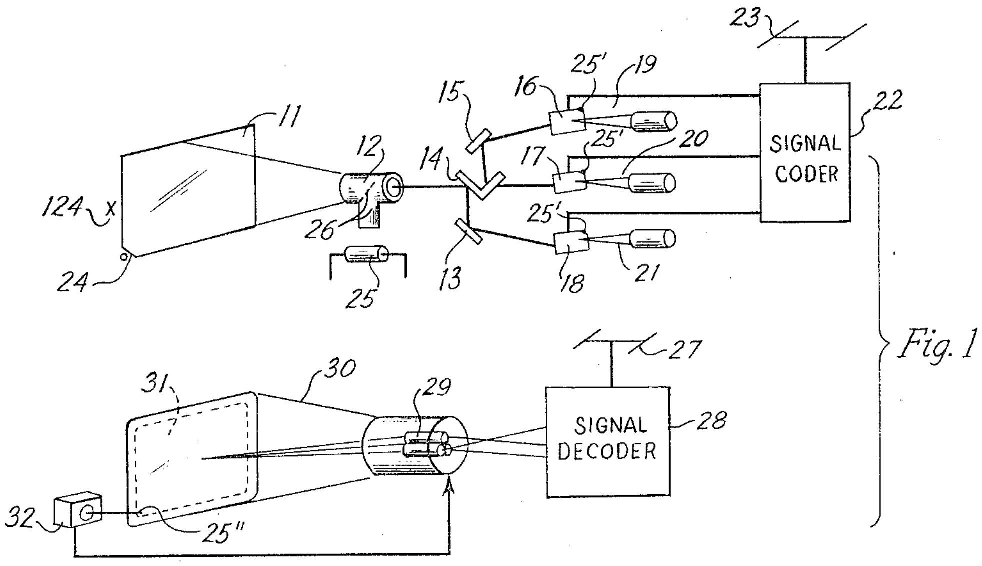
FIG. 1 is a diagrammatic representation of a transmitter and a receiver embodying the invention.

In the following description and in the claims various details will be identified by specific names for convenience. The names, however, are intended to be generic in their application. Corresponding reference characters refer to corresponding elements in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be practiced by other structural means than specifically shown.

Referring to FIG. 1 showing a representative camera, transmitter and receiver arrangement, light passes from a substantially rectangular natural color scene 11 through a camera lens 12 and a colored image is formed. The natural color image is separated into blue, green and red images by use of dichroic filters 13, 14 and 15, and the resulting three monochromatic images are focused onto photosensitive screens 16, 17 and 18. The light stimulable screens are scanned by electron beams 19, 20 and 21. Voltage signals are produced which are then coded at 22 and transmitted at 23. It is, of course, understood that the transmitter camera may be of other types than shown.

Figure 4:
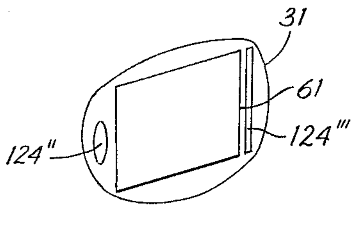
FIG. 4 shows a modified form of television viewing screen providing considerable space for a test spot.

The arrangement described up to this point is conventional, and known. It will now be observed that the substantially rectangular televised scene area 11 is shown with one corner 24 cut off to represent a portion of the televised area which is not visible to the viewer of a receiver screen, the cut off portions being preferably masked in the receiver, as will later be described. The area 24, the purpose of which will presently be explained, may also be located elsewhere, for example, at a point along a vertical side as indicated by the mark 124, as long as the point is within the area scanned by the camera. The location 124 is particularly advantageous, if the shape of the television tube screen is round or oval (FIG. 4).

A test spot of light composed of the three primary colors in a predetermined ratio of luminance is transmitted simultaneously with the scene 11. For this purpose a source of standard white light may be located at the very corner 24, but it is more convenient to incorporate the standard color source 25 within the camera and to provide suitable optical means 26 for focusing its image in such a manner that it appears as a spot at a point of the image corresponding to the location 24 or 124. It is so shown at 25' within each of the screens 16, 17 and 18 where it appears as a blue, green and red spot, respectively.

The transmitted signals emanating from the transmitter 23 therefore contain standard white, or balanced, color information.

The transmitted information is received at the receiver aerial 27, is decoded at 28 and fed to the control grids of three electron guns clustered at 29 within the television color tube enclosure 30. Three electron beams, one from each gun, scan blue-, green- and red-emitting phosphor dots at the screen 31 of the tube.

In this manner three monochromatic images are recreated, as they were sensed by the camera. The three primary re-created colors are mixed by the integrating action of the human eye which combines the individual color dots into a multicolor picture.

Also reproduced is the transmitted balanced-color or preferably white, spot which, assuming perfect color balance, will be reproduced as standard white, for example. It appears at 25'' on the screen and is normally hidden from the viewer's view, but is scrutinized by a twin color analyzer 32 through appropriate optical means.

If desired, two light spots may be transmitted and reproduced, one for each single analyzer. As previously stated, the spot may be located along the side of the tube at 124'', which is a particularly advantageous location for either round television tubes or for rectangular tubes modified to provide an extended screen area at a location corresponding to point 124. This is also indicated in FIG. 4 in which the spot is shown at 124'' and 61 represents a mask. A considerable area is available for the spot at this location, or even at the top or bottom.

The principal purpose of the color analyzer arrangement is to determine whether the primary color components of the reproduced spot 25'' are still in the balanced ratio in which they are present in the standard light source and to make, or cause to be made, an appropriate color correction adjustment, if an imbalance is found to exist.

Basically, it is, of course, possible to project the transmitted spot 25'' visibly on the screen and to produce a comparison spot of balanced ratio of luminances of its primary color components next to the spot 25'' to enable the viewer to operate electrical controls until a satisfactory match is obtained.

Nevertheless, it is preferred to bring about the color correction by automatic means so preset or pre-balanced as to sense an imbalance and effect a correction until balance is obtained.

A representative way of accomplishing this is as follows:

One of the primary colors is selected as standard of comparison for the analysis. This may be red, for example, or the white of the reproduced spot which contains red as one of its components. In case red is selected, the reproduced spot may be viewed through a red filter by the phototube. A multiplier phototube may be employed or any other suitable photoelectric cell. Also, a red-sensitive phototube may be used which may utilize the same red phosphor as used in the tube 30.

Figure 3:
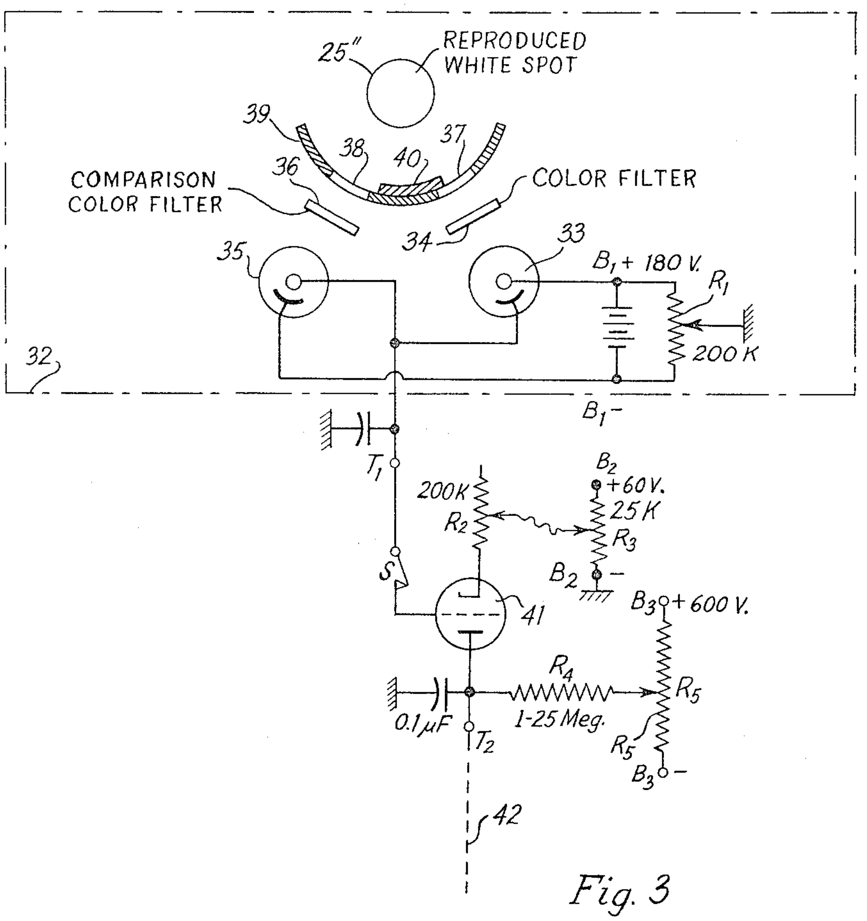
FIG. 3 is a diagram and circuit of a color analyzer representative of the two analyzers employed and control means for varying the luminance of one primary color of a picture tube.

Referring to FIG. 3, the reproduced white spot 25'' is shown as being viewed by a first phototube 33 through a green filter 34.

A second phototube 35 views a comparison color or component. In the illustrated arrangement the tube 35 receives light from the spot 25'' through a red filter 36.

The illustrated arrangement is for the purpose of producing a "green" control or adjustment, it being understood that a similar arrangement is provided for "blue" control. In the latter, a blue-sensing phototube would compare the luminance of the blue component of the spot 25'' with the luminance of the red component.

For the purpose of an initial adjustment differential diaphragm means are provided shown in the form of two apertures 37, 38 in a plate 39. The apertures may be covered and uncovered by a slide 40 to vary the relative amount of light acting on the tubes 33, 35.

The output of the tube 33 is opposed to the output of the tube 35 and the joint output, specifically the difference in output, is amplified in a suitable manner shown in the form of a triode 41 and applied to the first anode 42 of the green gun of the picture tube 30. The first anode is also sometimes referred to in the art as "screen grid". It controls the beam intensity and, hence, the luminance of the green primary color component produced on the picture screen.

Resistors $R_1$ through $R_5$ are employed in the circuit and direct potentials $B_1$, $B_2$ and $B_3$ are applied. The D.C. potential $B_1$ is of the order of 180 v., $B_2$ is of the order of 60 v., and $B_3$ of the order of 600 v. Resistor $R_4$ is of the order of 1 to 25 megohms; $R_1$, $R_2$, and $R_5$ are of the order 200,000 ohms, and $R_3$ is of the order of 25,000 ohms.

The function and operation of the compensating device is as follows:

It shall be assumed that the receiver is in a properly adjusted state, except for the color balance adjustment according to the present invention.

The conventional color television receiver adjustment involves firstly a basic adjustment for satisfactory black and white reception which is substantially as follows:

The video and vertical sweep signals are switched off so that only a single line appears on the screen of the picture tube. The bias control resistors conventionally installed in the set and shown at $R_6$, $R_5$, $R_9$ and $R_{11}$ are adjusted to apply the proper potentials at the green, blue and red first anodes 42 of the tube 30 to produce a dim white line on the screen.

The vertical sweep signals and the video signals are then switched on and the blue and green drive control resistors $R_7$ and $R_8$ are adjusted until a satisfactory monochrome picture is produced. Thereafter the color video signals are switched on, thus completing the basic adjustment.

Specific details of the basic adjustment procedure may vary, of course, according to the details of construction and circuitry of different makes of sets, the above-described procedure being representative. During the basic adjustment procedure the color compensator of FIG. 3 remained inactive, for example by having the triodes 41 and 141 unenergized.

The basic adjustment is then modified by readjusting resistors $R_5$ and $R_{11}$ to increase the previously set potentials at the first anodes 42 somewhat, the increase being up to about 30 percent as measured at test terminal $T_2$. This setting gives the picture excessive green and blue coloring, but disappears when the automatic control takes effect, as will be described further below.

The color comparators are next calibrated after opening the switch S at the respective triode, the triodes being deenergized.

The phototubes 33 and 35 of the blue and green comparators are exposed to a source of light selected as a standard, for example standard white or flesh-color tinted white, the standard light taking the place, for the purpose of calibration and adjustment, of the reproduced spot 25''. Resistor $R_1$ is adjusted so that ground is at its mid point. The slide 40 is adjusted to a position in which the grid potential of the triode 41 and 141, respectively, which is measured at the test terminal $T_1$ for this purpose is substantially zero. The reference light source is then removed and the comparators are exposed to the reproduced spot 25''.

Test terminal $T_1$ is next grounded, switch S is closed and the triode 41 is energized. The resistor $R_2$ is adjusted to a central position and the resistor $R_3$ is adjusted until the potential at the first anode 42 is reduced to the previous potential as set for black and white tracking, as measured at test terminal $T_2$.

Test terminal $T_1$ is then disconnected from ground and the receiver is ready for operation to maintain color balance automatically.

If the sensitivity of the triode amplifier is excessive or insufficient, an adjustment of the resistors $R_2$ and $R_3$ is made a reduction of the effective resistance causing an increase in the sensitivity of the amplifier.

The automatic color balance control operates as follows:

Assuming there is excessive luminance of green, which is the consequence of too high an intensity level of the green electron beam of the receiver tube 30, the tube 33 receives a correspondingly increased amount of light through 37, 34. The light increase produces a decrease in the resistance of the tube 33 which, in turn, results in a rise in the grid potential applied to the triode 41. The resistance across the triode decreases, leading to application of a decreased potential at the first anode 42. The intensity of the green beam is correspondingly reduced, resulting in reduced luminance of all the green dots of the screen 31.

In the event the viewer prefers to tint the reproduced picture and maintain a desired preset tint, he may vary the setting of the slide 40 (FIG. 3) or vary the bias potential of the grid of 41 by adjustment of $R_1$. He may also change the bias potential of the cathode by an adjustment of $R_3$, or he may vary the potential of the first anode 42 by an adjustment of $R_5$. These supplementary adjustments may be made to suit. Once made the comparator circuits shown in FIG. 3 (there being a total of two, one for green and one for blue) maintain the preset tint automatically.

Figure 2:
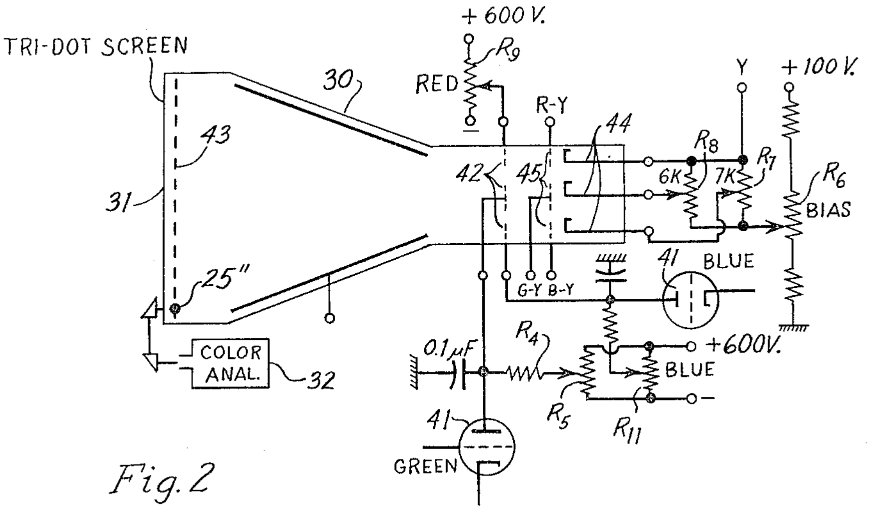
FIG. 2 is a diagram of principal components, as far as pertinent to an understanding of this invention, of a picture tube.

FIG. 2 illustrates as much of the principal elements of the picture tube as is essential for an understanding of the invention. The screen 31 of the tube 30 is preceded by the shadow mask 43. The cathodes of the electrode guns are indicated at 44, the control grids at 45, and the anodes are shown at 42.

In the specific above-given example the correction in luminance of the respective primary color is brought about by a control acting on the first anode. It will be obvious to persons skilled in the art that luminance control may also be brought about in other ways, for example by voltage variation at the respective cathode 44, or the respective control grid 45.

FIG. 4 shows a television tube having an oval screen masked by a rectangular mask 61 leaving considerable space for a fairly large test spot or spots 124'' and 124'''. The test spot may be located anywhere on the screen outside the scene area and may extend the full height or width of the screen.

Manifestly the invention is as useful for "live" television as it is for filmed or taped reproductions. In the latter case the film or magnetic tape either contains the spot signal information, or the control spot is added or dubbed in at the transmitting station on the basis of known lighting standards employed when recording the film or tape. In all such cases the signal which is decoded at or by the receiver contains the spot signal information.

It is also not necessary that the transmission and reproduction of the scene and picture respectively involves wireless broadcasting as the invention is equally applicable to closed circuit television.

It is readily seen that the aforedescribed method of achieving color balance is applicable not only to receivers, in which case color balance is maintained at the individual receiving set, but that it is also applicable to transmitters. In the latter case the color comparator becomes a monitoring instrument acting on the respective elements in the transmitter circuits to maintain color balance. The term transmitter circuits is used here as comprising the camera circuits.

For the purpose of controlling the levels of the color signals it is necessary only to control two signals, for example, green and blue in relation to the third color, for example red to maintain a proper balance of green to red and blue to red.

The control or adjustment is conveniently carried out at the camera image tubes, preferably before the camera signals are fed into the signal coder.

The control may therefore act on one or several of the elements of the image tubes or the circuits feeding the camera signals into the coder.

Figure 5:
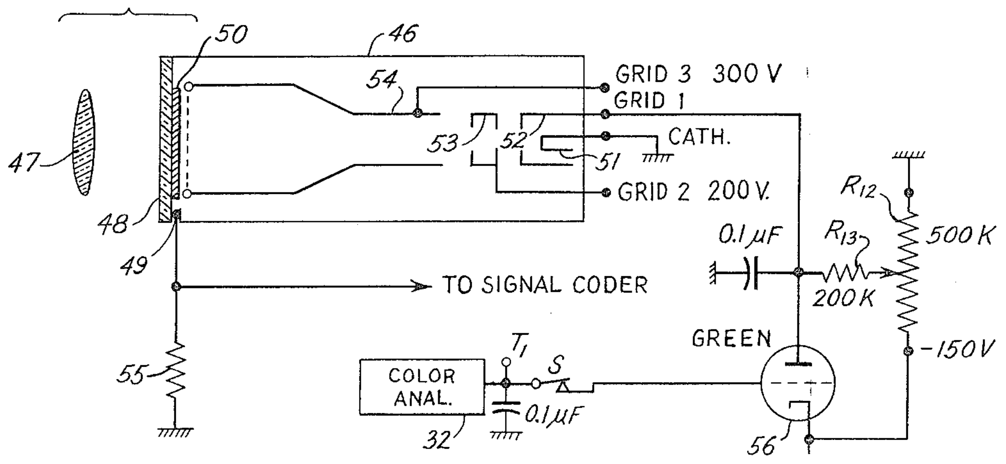
FIGS. 5 and 6 illustrate control devices for balancing the respective signal levels at transmitters in response to a monitoring action of a receiver.

FIG. 5 illustrates diagrammatically certain elements, as far as relevant for the present description, of an image tube 46 of the so-called "Vidicon" type. The various control coils, such as the horizontal and vertical deflection coils, the focusing coil and the alignment coil are omitted.

Suffice it to say that an image of a scene projected by the camera lens 47 falls on a glass plate 48 coated with a conductive film also referred to as signal electrode 49. On the signal electrode lies a photoconductive layer 50 capable of becoming electrically conductive when illuminated. The layer 50 experiences a change in voltage with respect to the signal electrode 49 which is normally positive. The resulting charge pattern is canned by an electron beam emitted from a cathode 51, controlled by a control grid 52 (also called grid 1), accelerated by an acceleration grid 53 (also called grid 2), and focused by a focusing electrode 54 (also called grid 3). A portion of the beam electrons is neutralized by the positive charges of the image pattern, and the variations in the electron absorption produce a signal current across an output load resistor 55.

According to the arrangement of FIG. 5, the color analyzer 32 is connected to the image tube through a triode 56 and acts to vary the bias setting of the control grid 52 which was previously preset at a bias resistor $R_{12}$, the bias being applied over a further resistor $R_{13}$.

Assuming the color analyzer 32 responds to the green component of the spot reproduced at the monitor receiver, the control effected by the analyzer does not act on the receiver circuit directly, but rather on the transmitter in the following manner.

Assuming the level of the green transmitter signal is excessive, the green color analyzer responds by increasing the grid potential at the triode 56. The triode reduces the control grid potential applied at 52 and causes a corresponding decrease in the signal sent by the image tube to the signal coder or preamplifier.

The initial preadjustment procedure for the control grid 52 may follow the procedure described above for the color balanced receiver.

Thus, the bias control of the control grid 52 is first manually adjusted at $R_{12}$ as previously described, the test terminal $T_1$ being grounded, switch S closed and the triode 56 energized until the desired color balance is established. Test terminal $T_1$ is then disconnected from ground and the color analyzer then assumes its function of maintaining color balance automatically.

Operation, adjustment and control of the blue image tube is carried out in the same manner.

The image tube for the red video signal is manually adjusted to the desired signal output level, and the green and blue signals remain matched in level to that of the red by automatic control.

Figure 6:
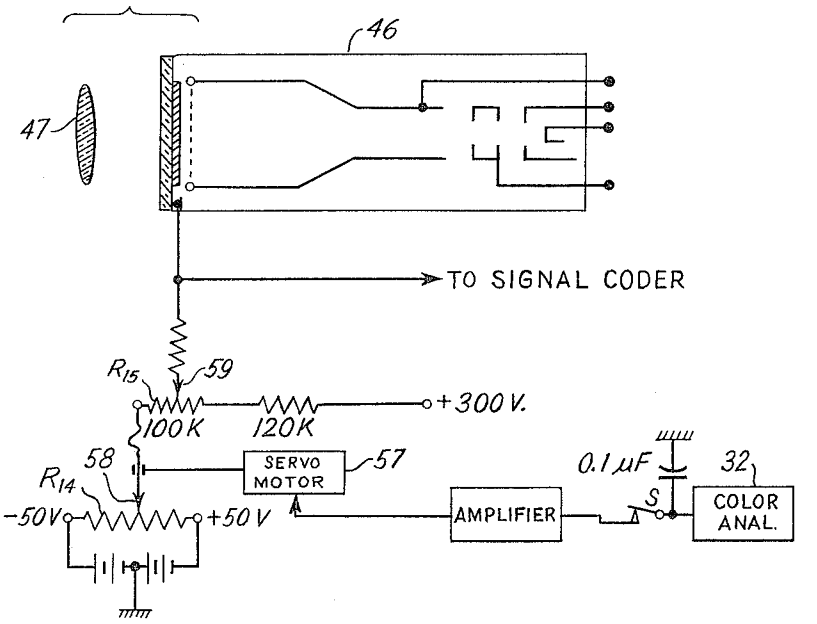

It is manifest that the specific control of the signal level may be accomplished by acting on other elements of the signal generating circuits. An example is given in FIG. 6.

In the illustrated arrangement a servo-motor mechanism 57 controlled by the color analyzer 32 mechanically moves the movable contact 58 of a bias resistor $R_{14}$ to vary the bias potential applied to the signal electrode 49 of the image tube 46. An amplifier 60 is provided between the analyzer 32 and the servo mechanism 57.

Two bias adjustments are provided. A manual adjustment may first be made at the movable contact 59 of a resistor $R_{15}$. The automatic adjustment effected by the analyzer-controlled servo-motor 57 is then superimposed on the manual setting of 58.

Assuming again that the illustrated arrangement is for the purpose of green control, an excess in the level of the green signal causes the color analyzer 32 to actuate the servo mechanism 57 to move in a direction to decrease the bias applied to the signal electrode. This diminishes the green electron beam correspondingly and the servo mechanism comes to rest when the proper color balance is achieved.

The blue signal control is effected in the same manner.

The automatic color balance control of the transmitter acts in such a manner on the circuit elements of the transmitter or its camera tubes that relative excess of one color in the reproduced scene and spot in the receiver causes an adjustment in a sense to reduce the excess luminance of that one reproduced color until the color balance is restored.

In general the American standard of television transmission uses negative video polarity. Camera tubes such as the "Vidicon" type tube, which produce video signals of positive polarity, are generally used in conjunction with a negative clamping circuit which converts the positive tube signal into a negative video signal.

Other camera tubes such as the "Orthicon" type tube function in such a manner that an increase in the brightness of the optical image projected on their photocathode causes the output signals to decrease towards a more negative potential. In this case the automatic color balance control acts on the output signal circuit of the camera tube in such a manner that the relative excess in luminance of one color component in the reproduced spot or scene causes an increase in the potential of the output signal to a less negative value until color balance is restored.

In the illustrated applications of the invention photoelectric comparators are employed to compare current intensity level ratios derived from the received television signals with preset ratios derived, for example, by a standard reference light. Manifestly the current intensify level ratios may be determined purely electrically. Such and other modifications will be apparent to persons skilled in the art.

The invention is applicable to any system of color television in which the receiver reproduces the televised scene by three beams, one for each primary color, directed against a screen, the beams being modulated to vary in intensity in accordance with the brightness of the primary colors of the original scene which is being scanned by the camera.

Such reproducing beams may be light beams of the laser type which sweep a screen in synchronism with the beams of the scanning camera.

What is claimed is:

1. In the method of transmitting and reproducing a television color picture of a scene, the steps which comprise scanning a test spot by the three image beams of the transmitter camera within a sweep range sufficiently large to comprise both the spot and the scene image to be televised, said test spot being composed of the three primary colors at a certain ratio of luminance adopted as a standard;

deriving from the image beams, at the instant of scanning of the test spot by the image beams, three control signals which are a function of the luminance of the respective three primary colors as contained in said spot;

transmitting said control signals and the video signals, the video signals representing the scene;

receiving said control signals and said video signals at a receiver and converting the received control signals in'o picture beam currents of the respective three electron beams of the receiver;

determining the deviation, if any, of the ratio of the said control-signal produced picture beam currents from a present arbitrarily selected reference ratio for the respective picture beam currents and adjusting the ratio of the picture beam currents substantially to equal said reference ratio;

and maintaining the said adjustment throughout the period of reproduction of the scene in response to the video signals immediately following said control signals until reception of the next control signals resultant from the next scanning of the spot.

2. In the method of transmitting and reproducing a television color picture of a scene, the steps which comprise scanning a test spot by the three image beams of the transmitter camera within a sweep range sufficiently large to comprise both the spot and the scene image to be televised, said test spot being composed of the three primary colors at a certain ratio of luminance adopted as a standard;

deriving from the image beams, at the instant of scanning of the test spot by the image beams, three control signals which are a function of the luminance of the respective three primary colors as contained in said spot;

transmitting said control signals and the video signals, the video signals representing the scene;

receiving said control signals and said video signals at a receiver and converting the received control signals into picture beam currents of the respective three electron beams of the receiver;

adjusting the level of intensity of two of the picture beam currents of the three electron beams of the receiver in relation to the level of the third picture beam current, as generated by said received control signals, to produce a current ratio substantially equal to a predetermined arbitrarily selected reference ratio for the periods of scanning of the spot;

and maintaining said adjusted current level ratio throughout the period of reproduc'ion of the scene in response to the video signals received immediately following said control signals until reception of the next control signals resultant from the next scanning of the spot.

3. In the method of transmitting and reproducing a television color picture of a scene, the steps which comprise scanning a test spot by the three image beams of the transmitter camera within a sweep range sufficiently large to comprise both the spot and the scene image to be televised, said test spot being composed of the three primary colors at a certain ratio of luminance adopted as a standard, the brightness of the test spot exceeding the brightest portion of the scene to be televised;

deriving from the image beams, at the instant of scanning of the test spot by the image beams, three control signals which are a function of the luminance of the respective three primary colors as contained in said spot;

transmitting said control signals and the video signals, the video signals representing the scene;

receiving said control and video signals at a receiver and converting the received control signals into picture beam currents of the electron beams of the receiver, which currents become maxima at the instant of scanning of said spot;

adjusting the level of intensity of two of the picture beam currents of the three electron beams of the receiver in relation to the level of the third picture beam current in such a way that the ratio of their maxima is substantially equal to a predetermined arbitrarily selected reference ratio;

and maintaining said adjusted current level ratio throughout the period of reproduction of the scene in response to the video signals received immediately following the control signals, which produced the maxima, until reception of the next maxima resultant from the next scanning of the spot.

4. In the method of transmitting and reproducing a television color picture of a scene, the steps which comprise periodically scanning by the three image beams of the transmitter camera a test spot composed of the three primary colors at a certain ratio of luminance adopted as a standard, the brightness of the best spot being selected to exceed that of the brightest portion of the scene to be televised;

transmitting video signals controlled by said three image beams;

receiving said video signals at a receiver and converting the signals into picture beam currents of the respective three electron beams of the receiver, which currents reach maxima at the instant of scanning of the spot;

adjusting the level of intensity of the three picture beam currents substantially to equal a predetermined arbitrarily selected reference ratio at the moment the picture beam currents become maxima, and maintaining the adjusted current level ratio during the periods between the respective maxima.

5. The method of producing a color-corrected television picture of a scene, which method comprises transmitting as signals, in addition to the scene, a comparison light spot comprising the component primary colors in a predetermined ratio; reproducing at the receiver the scene and the spot from the received signals; determining the ratio of the luminances of the primary color components of the reproduced spot; and varying the ratio of the luminances of the reproduced component primary colors substantially to equal said predetermined ratio.

6. The method according to claim 5 in which the spot is substantially white.

7. The method according to claim 5 in which the spot is reproduced on a marginal portion of the receiver screen masked from view.

8. The method according to claim 5 in which the luminance of two of the primary color components of the reproduced spot is compared to that of the third primary color of the reproduced spot.

9. The method according to claim 5 in which the luminance of two of the primary color components of the reproduced spot is compared to the white of the reproduced spot.

10. The method according to claim 5 in which the luminance of a reproduced primary color is varied by varying the intensity level of the respective electron beam of the receiver.

11. In the method of reproducing in a color television receiver a color-corrected picture of a scene, the steps of reproducing a test spot transmitted in addition to the scene, said test spot, as transmitted, comprising the primary colors in a predetermined ratio of luminances; analyzing the reproduced spot to determine the ratio of luminances of the primary colors, as reproduced; and varying the ratio of luminance of the respective reproduced primary colors substantially to equal said predetermined ratio.

12. The method according to claim 11 in which the test spot is substantially white.

13. The method according to claim 11 in which the spot is reproduced on a marginal portion of the receiver screen masked from view.

14. The method according to claim 11 comprising the steps of generating at the receiver two control signals, one signal which is proportional to the ratio, at the moment of reproduction of the spot, of the beam current producing one of the primary color components of the reproduced spot in relation to the beam current producing a second primary color component, the other signal which is proportional to the ratio, at the same moment, of the beam current producing the third primary color component in relation to the beam current producing the said second primary color component; and varying the intensity of at least one of the three electron beams of the receiver in a sense to reduce the ratio of said two signals substantially equal to a predetermined arbitrarily set reference ratio.

15. The method according to claim 11 comprising the steps of generating at the receiver two control signals, one control signal which is proportional to the ratio of luminance of one of the primary color components of the reproduced spot in relation to the luminance of a second primary color component, and another signal which is proportional to the luminance of the third primary color component of the reproduced spot in relation to the luminance of said second color component, said two signals being calibrated to be equal for the condition of color balance; and varying the intensity of at least one of the three electron beams of the receiver in a sense to maintain the ratio of said two signals substantially equal to a predetermined arbitrarily set reference ratio.

16. The method according to claim 11 comprising the steps of generating at the receiver two control signals, one signal which is proportional to the ratio, at the moment of reproduction of the spot, of the beam current producing one of the primary color components of the reproduced spot in relation to the beam current which produces a second primary color component, the other signal which is proportional to the ratio, at the same moment, of the beam current producing the third primary color component in relation to the beam current producing the said second primary color component, said two signals being calibrated to be equal for the condition of color balance, generating a third signal proportional to an imbalance of said first and said other signal; and applying the third signal to vary the intensity of the electron beam of the color which is out of balance in a sense to restore the balance.

17. In a color television receiver comprising a picture tube, which tube comprises a color screen and three means projecting electron beams against said screen to activate the respective primary color phosphors of the screen, the improvement which comprises, a first comparator responsive at periodically recurring moments to the ratio of the beam current of one of the primary color beams in relation to the beam current, at the same moment, of a second primary color beam; a second comparator responsive at the same moment to the ratio of the beam current of a third of the primary colors in relation to the beam current of said second primary color; and means controlled by said two comparators for acting on said electron beam projecting means, to vary the respective beams' intensities to maintain a predetermined relationship between said two ratios.

18. The improvement defined in claim 17 in which the two comparators are photoelectric comparators.

19. The improvement defined in claim 17 in which the two comparators are photoelectric comparators arranged to receive light from at least one marginal area of the screen.

20. In a color television receiver comprising a picture tube, which tube comprises a color screen and three means for projecting electron beams against said screen to activate the respective primary color phosphors of the screen, the improvement which comprises, a first comparator responsive to the ratio of periodically recurring maxima of the current of one of the primary color beams in relation to the maxima of the beam current of a second primary color beam; a second comparator responsive to the ratio of the maxima of the current of the third of the primary color beams in relation to current maxima of said second primary color beam; and means controlled by said two comparators for acting on said electron beam projecting means to vary the respective beams' intensities to maintain a predetermined relationship between said two ratios.

21. In a color television receiver comprising, a picture tube, which tube comprises a three-phosphor screen and three means for projecting electron beams against said screen to activate the respective primary color phosphors of the screen; and control means for varying the intensity of said beams, thereby varying the luminance of the respective primary screen colors, the improvement which comprises, a first color comparator responsive to the difference in luminance of one of the primary colors generated on a test area of the screen in relation to the luminance of a secondary primary color; a second color comparator responsive to the difference in luminance of the third of the primary colors generated on a test area of the screen in relation to the luminance of said second color; and means jointly controlled by said two comparators for actuating said intensity control means of said beams.

22. The improvement defined in claim 21 in which both comparators are actuated by the light of the same test area of the screen.

23. The method of correcting the color balance of television signals of a scene, which method comprises, transmitting as singals, in addition to the scene, a comparison light spot comprising the component primary colors in a predetermined ratio of luminance; receiving at a receiver the light spot signals and converting them into picture tube beam currents; generating a first control signal which is proportional to the ratio of one of the primary color beam currents in relation to a second of the primary color beam currents; generating a second control signal which is proportional to the ratio of the third of the primary color beam currents in relation to said second beam current; and varying by said control signals the level of the primary color signals being transmitted of the scene and said spot.

24. The method of correcting the color balance of television signals of a scene, which method comprises transmitting as signals, in addition to the scene, a comparison light spot comprising the three component primary colors in a predetermined ratio of luminance; reproducing at a receiver the spot from the transmitted signals; determining the ratio of the luminances of the primary color components of the reproduced spot; and varying the ratio of the magnitude of the transmitted primary color signals until the ratio of the luminances of the reproduced component primary colors is substantially equal to said predetermined ratio.

25. The method according to claim 24 in which the comparison light spot is substantially white.

26. The method according to claim 24 in which the comparison light spot is substantially flesh colored.

27. The method of correcting the color balance of television signals modulated to transmit three primary colors, which method comprises transmitting as such signals a comparison light spot comprising the component colors at a predetermined ratio of luminance; reproducing at a receiver the said spot from the transmitted signals; comparing the ratio of the luminance of the primary color components of the reproduced spot with said predetermined ratio; and varying the level of the primary color signals being transmitted to maintain the ratio of luminance of the primary color components of the reproduced spot substantially equal to the said predetermined ratio.

28. The method as claimed in claim 27 in which two sources of light are employed, which sources contain the primary colors in a predetermined ratio of luminance, one source at the transmitter camera and the other, as a standard of comparison, at the said receiver.

29. In a color television transmitter comprising a color camera, means for generating electrical signals to be transmitted, and modulator means controlled by said camera for modulating said signals in dependence on color hue values, the improvement which comprises, means for including in the modulated signals intelligence of a comparison multicolor light spot comprising the component primary colors at a predetermined ratio of luminance; monitor means for reproducing said comparison spot from the modulated signals; comparator means at said monitor means for determining deviation of the ratio of luminances of the reproduced spot from said predetermined ratio; and means operable by said comparator means for adjusting the level of the respective color signals being transmitted in a sense to reduce such deviation substantially to zero.

30. The method of correcting the color balance of a television picture reproduced by a receiver, which method comprises, transmitting, in alternating sequence, two kinds of signals, viz., (a) video signals representing the scene being televised and (b) signals representing a comparison light spot comprising the three primary colors in a predetermined ratio of luminance; receiving at the receiver the light spot signals and converting them into three picture tube beam currents for the respective primary colors; adjusting the level of intensity of at least one, and not more than two, picture beam currents in relation to the level of the third picture beam current produced by the reception of said spot to make their ratio substantially equal to a predetermined arbitrarily selected reference ratio; and then maintaining the adjustment of the ratio of the beam intensity levels through the subsequent period of reception of the said video signals representing the scene until a further period of reception of further signals representing a comparison light spot.

31. The method of correcting the color balance of a television picture reproduced by a receiver, which method comprises, transmitting, in alternating sequence, two kinds of signals, viz., (a) video signals representing the scene being televised and (b) signals representing a comparison light spot comprising the three primary colors in a predetermined ratio of luminance; receiving at the receiver the light spot signals and converting them into picture beam currents of the respective three electron beams of the receiver; adjusting the level of intensity of two of the picture beam currents of the three electron beams of the receiver in relation to the level of the third picture beam current, as generated by the received light spot signals, to produce a current ratio substantially equal to a predetermined arbitrarily selected reference ratio; and then maintaining the adjustment of the ratio of the beam intensity levels through the subsequent period of reception of the said video signals representing the scene until a further period of reception of further signals representing a comparison light spot.

32. The method of correcting the color balance of a television picture reproduced by a receiver, which method comprises, transmitting, in alternating sequence, two kinds of signals, viz., (a) video signals representing the scene being televised and (b) signals representing a comparison light spot comprising the three primary colors in a predetermined ratio of luminance; receiving at the receiver the light spot signals and converting them into a picture of the spot reproduced on the receiver screen; photo-analyzing the reproduced spot and generating two control signals, one control signal which is proportional to the ratio of luminance of one of the primary color components of the reproduced spot in relation to the luminance of a second primary color component, and another control signal which is proportional to the luminance of the third primary color component of the reproduced spot in relation to the luminance of said second color component; adjusting the intensity of at least one of the three electron beams of the receiver in a sense to maintain the ratio of magnitude of said first control signal in relation to said second control signal substantially equal to a predetermined arbitrarily selected reference ratio; and maintaining the adjustment through the subsequent period of reception of the video signals representing the scene until a further period of reception of further signals representing a comparison light spot.

33. The method of correcting a television receiver for color balance of the scene reproduced on the screen of its picture tube, the method comprising, receiving, on the same channel and in alternating sequence, transmitted signals of the scene, and of a comparison light spot; and converting the signals into picture beam currents of the respective three electron beams of the receiver; adjusting during the period of reception of the spot signals the level of intensity of the three picture beam currents relatively to each other substantially to equal a predetermined arbitrarily selected reference ratio; and maintaining the adjusted current level ratio during the subsequent period of reception of the scene signals.

34. The method according to claim 33 in which the relative level of intensity of the beam currents representing the three primary color components is compared by projecting said beams on the screen on the picture tube; and determining the relative luminance of two of the primary color components of the reproduced spot in relation to the luminance of the third primary color component of the reproduced spot.

References Cited

UNITED STATES PATENTS

| | | | |
|---|---|---|---|
| 2,854,505 | 9/1958 | Davis | 178—5.4 |
| 2,931,856 | 4/1960 | Davis et al. | 178—5.4 |
| 3,334,178 | 8/1967 | Brooks | 178—5.4 |

RICHARD MURRAY, Primary Examiner

J. C. MARTIN, Assistant Examiner